United States Patent [19]

Wallace et al.

[11] 4,420,717

[45] Dec. 13, 1983

[54] USE OF MOTOR WINDING AS INTEGRATOR TO GENERATE SAWTOOTH FOR SWITCH MODE CURRENT REGULATOR

[75] Inventors: Steven J. Wallace; Paul L. Culley, both of Houston, Tex.

[73] Assignee: Texas Instruments Incorporated, Dallas, Tex.

[21] Appl. No.: 193,988

[22] Filed: Oct. 6, 1980

[51] Int. Cl.$^3$ .......................................... H02K 29/04
[52] U.S. Cl. .................................... 318/696; 318/685
[58] Field of Search .............. 318/685, 696, 432, 678, 318/681; 307/341, 289, 291

[56] References Cited

U.S. PATENT DOCUMENTS

| | | | |
|---|---|---|---|
| 3,750,000 | 7/1973 | Bruckner et al. | 318/685 |
| 3,976,926 | 8/1976 | Egbert | 318/331 |
| 4,282,472 | 8/1981 | Martin | 318/696 |

*Primary Examiner*—J. V. Truhe
*Assistant Examiner*—Saul M. Bergmann
*Attorney, Agent, or Firm*—Thomas G. Devine; Leo N. Heiting; Melvin Sharp

[57] ABSTRACT

A stepper motor for use in peripheral devices such as electronic printing terminals has its coils selected for activation by selection circuitry, with its power provided by a switch mode current regulator. The switch mode regulator utilizes the selected motor winding as the storage element of the regulator and the voltage ramp derived from the current flow through the motor coil itself for comparison with a reference voltage. The output of the comparator circuit controls the state of a latch which has a fixed frequency clock input. The frequency of the latch output is fixed, but the on time and off time of the latch varies in accordance with the output of the comparator. A comparator and latch circuit therefore form a pulse width modulator which then regulates the on and off time of the switching regulator power transistor.

12 Claims, 4 Drawing Figures

USE OF MOTOR WINDING AS INTEGRATOR TO GENERATE SAWTOOTH FOR SWITCH MODE CURRENT REGULATOR

BACKGROUND OF THE INVENTION

1. Field of the Invention

This invention relates to drive circuits for stepper motor and in particular to switch mode current regulators for providing current to the coils of a stepper motor for use in peripheral devices such as electronic printing terminals.

2. Description of the Prior Art

Prior art stepper motors have had power supplies that were large enough to provide power required for peak acceleration and torque. This type of driver required a relatively large amount of power to operate, with attendant problems such as excessive weight and heat dissipation.

Switch mode current regulators were then provided as drivers for stepper motors. In these state-of-the-art regulators, it is common practice to apply a sawtooth voltage at the desired frequency to a comparator where it is compared to the control voltage. The output of the comparator is a pulse stream with the pulse widths dependent on the control voltage. The sawtooth voltage is generated by a sawtooth oscillator, or by capacitive integration of a square wave.

In the present invention, instead of generating a sawtooth voltage, the current through the motor coil itself is conducted through a sensing resistor with that voltage then applied directly to one input to a comparator as the ramping voltage necessary to achieve pulse width modulation.

BRIEF SUMMARY OF THE INVENTION

A switch mode current regulator activates a selected winding of a stepper motor. The stepper motor may be used in peripheral devices such as printing terminals for moving the printhead.

The switch mode current regulator according to this invention utilizes a voltage ramp developed from the current flowing through the selected motor coil itself. That voltage ramp provides one input to a comparator. The other input to the comparator is provided by a reference voltage. When the stepper motor is to remain in detente, then a relatively low reference voltage is applied. When it is desired to accelerate the motor, a higher reference voltage is applied. When the amplitude of the voltage ramp reaches the amplitude of the reference voltage, the output of the comparator goes low. Copending patent application Ser. No. 944,036 filed Sept. 19, 1978, now U.S. Pat. No. 4,225,913 entitled "Self Referencing Power Converter" and assigned to the assignee of this invention teaches the use of an exact representation of the voltage across the primary of a transformer as a ramp voltage. However, the similarity between that converter and the regulator of this invention ends with the ramp voltage generation.

A toggling latch circuit has a clock input as the toggle input. The clock input is gated by the output from the latch circuit to permit setting of the latch only when it is not being cleared. The clear input to the latch is provided by the output from the comparator. When the output from the comparator is low, then the clear input is high, disabling the latch circuit from being set by the clock input. The output of the latch circuit controls the power transistor which connects and disconnects the selected coil from a DC power source.

The clock input provides a fixed frequency output. The output of the comparator determines how long the latch is set and cleared within a fixed period. Thus the combination of the comparator and latch circuit provides a pulse width modulator which controls the power transistor of the regulator. Copending patent application Ser. No. 371,362 filed Apr. 23, 1982, a continuation application of Ser. No. 146,992 filed May 5, 1980, now abandoned and entitled "Switching Regulator For Terminal Printhead", assigned to the assignee of this invention, shares with this invention the feature of a comparator and latch circuit pulse width modulation technique.

The principal object of this invention is to provide a switch mode current regulator for driving a selected winding of a stepper motor.

Another object of this invention is to provide a switch mode current regulator for driving a selected winding of the stepper motor which is employed for moving the printhead in a printing terminal.

Still another object of this invention is to provide a switch mode current regulator for driving a stepper motor which utilizes a voltage ramp generated by the current passing through the selected winding of the stepper motor in conjunction with a comparator-latch pulse width modulator.

These and other objects will be made evident in the detailed description that follows.

DETAILED DESCRIPTION OF THE INVENTION

This invention is in a switch mode current regulator for providing power to a stepper motor. A comparator-latch circuit pulse width modulator and the application of a voltage ramp derived from the actual current through the selected winding of the driven stepper motor to the comparator for comparison with a reference voltage provides a novel regulator. The regulator-stepper motor combination may be used in many applications. In this preferred embodiment it is used in the terminal described herein.

Figure 1A:
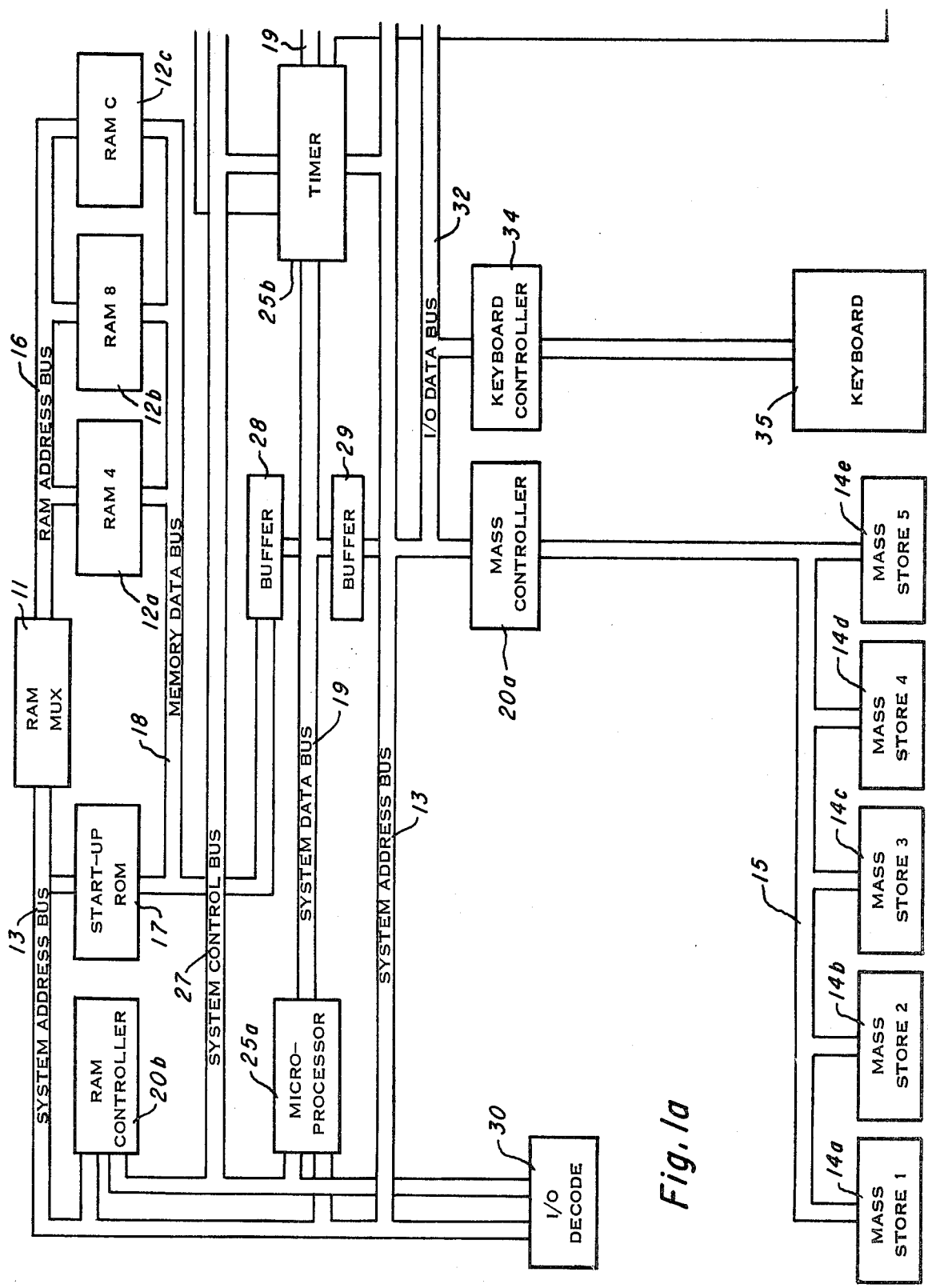
FIGS. 1a and 1b are block diagrams of an electronic printing terminal employing the switch mode current regulator of this invention.
Figure 1B:
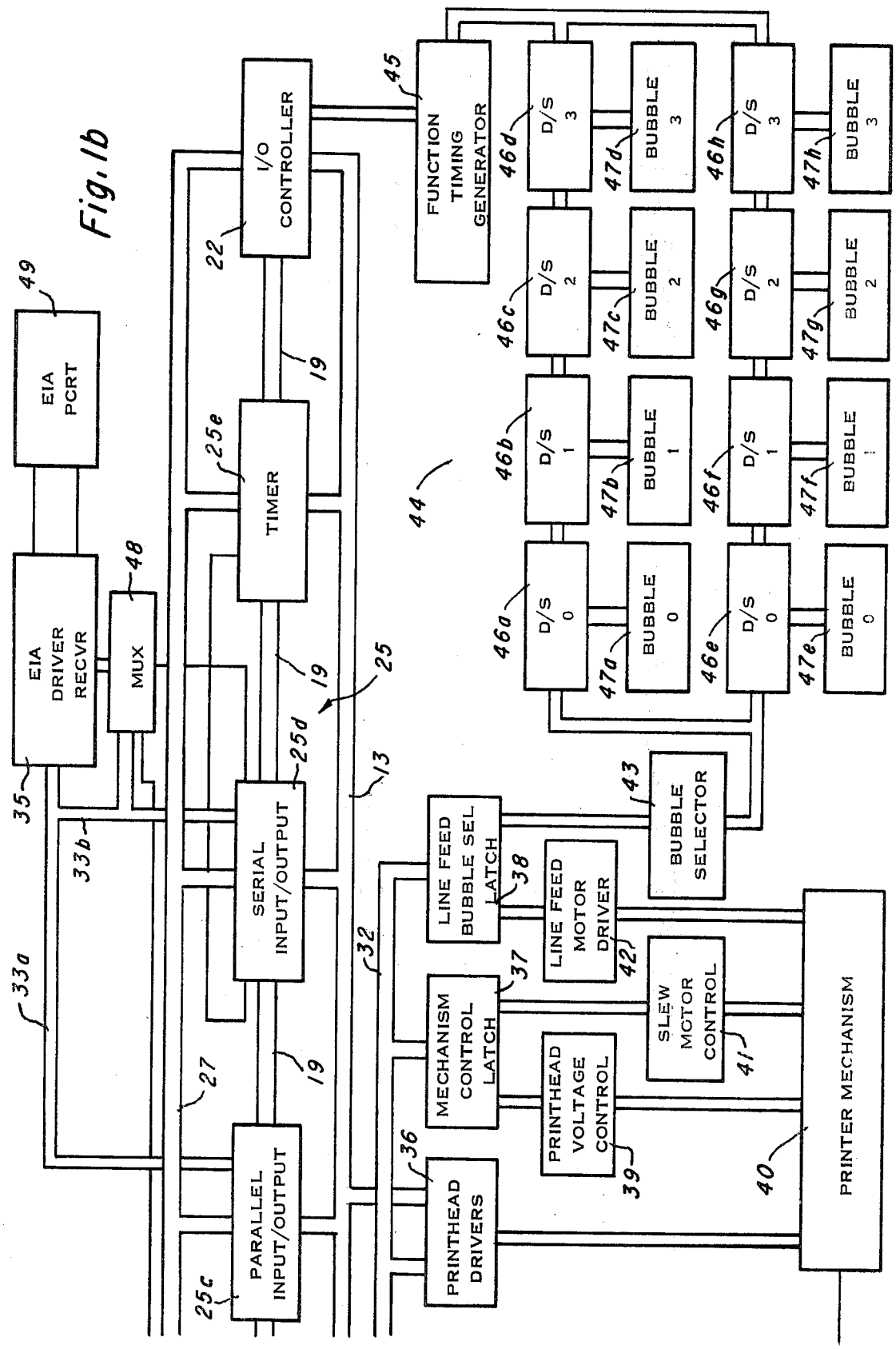

Turning first to FIG. 1, the printing terminal employing the regulator of this invention is illustrated in block form. Microprocessor 25a, timer 25b, parallel input-/output unit 25c, serial input/output unit 25d and timer 25e form the total microprocessor of this invention. The particular microprocessor selected for implementing this invention is the Zilog Company Z80A made up of components 25a through 25e, all described in "Zilog Microcomputer Components Data Book" dated February, 1980. System control bus 27 extends from microprocessor 25a to timer 25b, to parallel input/output unit 25c, to serial input/output unit 25d, to timer 25e and to I/O controller 22. System address bus 13 extends from microprocessor 25a to timer 25b, to parallel input/output unit 25c, to serial input/output unit 25d, to timer 25e and to I/O controller 22. I/O controller 22 is Texas Instruments Incorporated type TMS5501 and is used for communication with function timing generator 45 for use with bubble memory 44. Bubble memory 44 is comprised of units 47a–47h controlled by drive sense modules 46a–46h. The bubble memory is peripheral to this invention and need not be described in detail here.

The system data bus 19 from microprocessor 25a is serially connected to microprocessor units 25b–25e, terminating in I/O controller 22. Buffers 28 and 29 are connected to system data bus 19. Buffer 28 interconnects memory data bus 18 with system data bus 9. Buffer 29 interconnects I/O data bus 32 with system data bus 9. I/O data bus 32 is connected to keyboard controller 34, printhead drivers 36, mechanism control latch 37 and line feed bubble select latch 38. Latch 38 has an output connected to the input of bubble selector 43 which in turn is connected to the bubble memory 44. An output from latch 38 provides an input to line feed motor driver 42 which is part of a printer having an output to the printer mechanism 40. Printhead drivers 36 also are connected to printer mechanism 40. Latch 37 has one output connected to printhead voltage control 39 which in turn has an output connected to the printer mechanism 40. Latch 37 also has an output to slew motor control 41 whose output is connected to the printer mechanism 40. Slew motor control 41 is described in detail in FIGS. 2 and 3.

Keyboard controller 34 is connected to keyboard 35. The keyboard 35 and keyboard controller 34 are well known and need not be described in detail.

I/O decode 30 is made up of a programmable logic array and a decoder. The combination of these two components provides output signals in response to command and address input signals from microprocessor 25a.

EIA port 49 is connected to EIA driver-receiver 35 which in turn is connected through bus 33a to parallel input/output unit 25c and through bus 33b to serial input/output unit 25d. A baud rate source multiplexer 48 is connected to unit 35 and also to unit 25d to provide synchronization. The EIA port 49 and associated hardware described is for communication involving 24 volt levels. This is old in the art and need not be described in detail here.

Mass controller 20a is connected to buffer 29 through I/O data bus 32. Mass store 1 through mass store 5 (14a–14e) form the read-only mass memory 14 and are connected by bus 15 to mass controller 20a.

RAM controller 20b is connected to I/O decoder 30 and microprocessor 25 by way of system control bus 27. RAM controller 20b is also connected by way of the system address bus 13 to microprocessor 25a and I/O decode 30. Start-up ROM 17 is connected to memory data bus 18 and to system address bus 13. Its permanently stored instructions form a boot strap program to enable the microprocessor 25a to utilize preliminary instructions.

RAM multiplexer 11 receives its inputs from system address bus 13 and addresses RAM 12 which is connected by RAM address bus 16 to RAM mux 11. Memory data bus 18 is connected to RAM 12 as well.

RAM 12, start-up ROM 17, controllers 20a and 20b, and read-only mass memory 14, together with I/O decode 30 and microprocessor 25, and associated buses and buffers enable a virtual memory technique which is fully described in copending U.S. patent application Ser. No. 191,892 filed Sept. 29, 1980 and assigned to the assignee of this invention.

Figure 2:
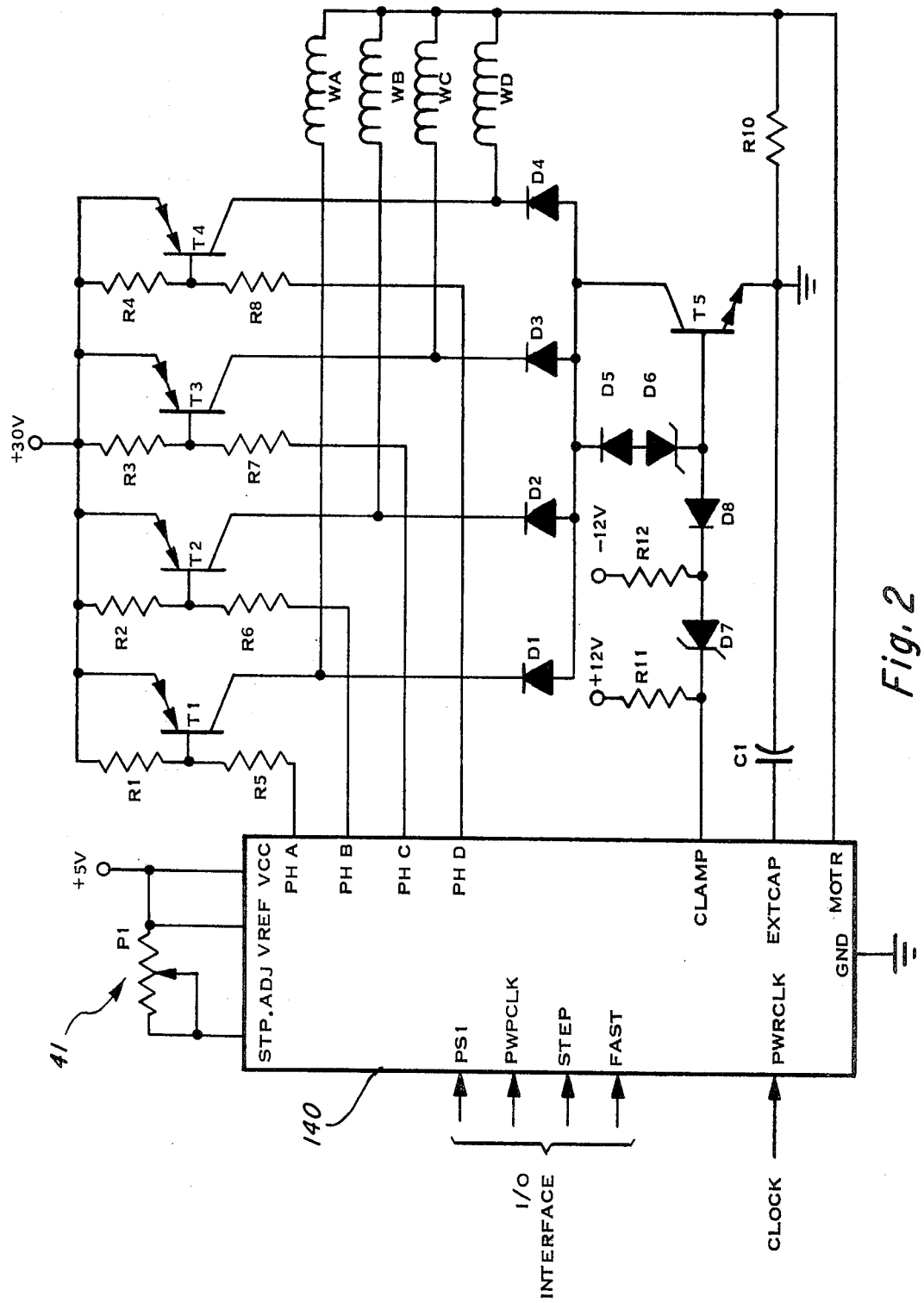
FIG. 2 is a block and schematic diagram of the regulator.
Figure 3:
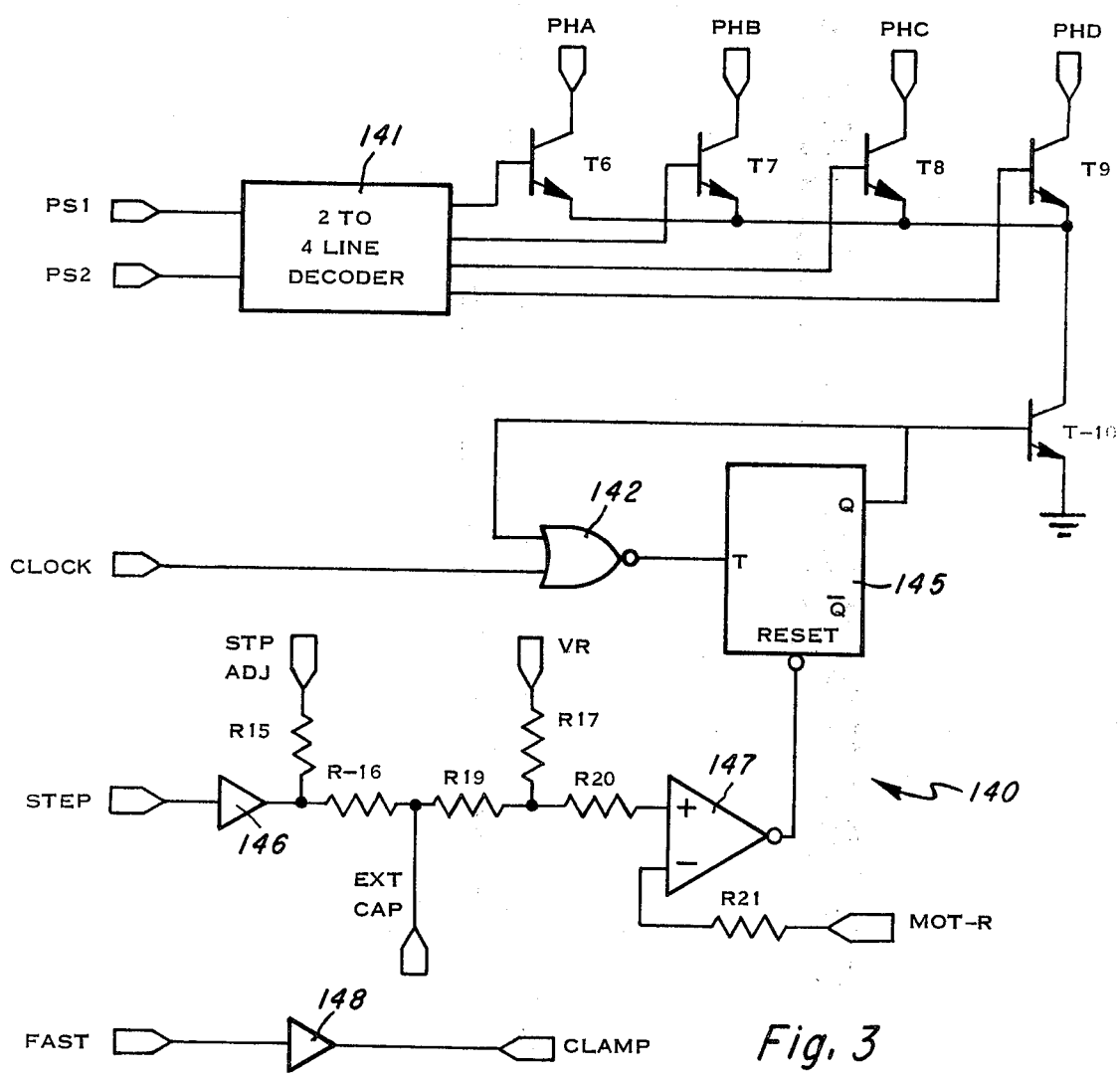
FIG. 3 is a schematic diagram of chip 140 of FIG. 2.

FIG. 2 illustrates a semiconductor chip 140 which contains circuitry for the inventive regulator and is shown in detail in FIG. 3. Terminals "PS1", "PS2", "STEP" and and "FAST" have appropriate signals that come from the microprocessor 25 through an I/O interface. Referring to FIG. 3, signals PS1 and PS2 are shown applied to two-to-four line decoder 141 where the signals are decoded to place base drive on the selected ones of transistors T6, T7, T8 and T9. In FIG. 3, it can be seen that the emitters of transistors T6–T9 are tied together to the collector of transistor T10. The collectors of transistors T6–T9 provide selection signals from terminals "PHA", "PHB", "PHC" and "PHD" respectively. The step signal provides an input to buffer 146 whose output is connected through resistor R15 to end terminal "STP ADJ." The output of buffer 146 is also connected through resistor R16 to terminal "EXT CAP". Terminal "EXT CAP" is connected through resistor R19 to the junction of resistors R17 and R18. R17 is connected to terminal "V REF" and resistor R18 is connected to ground. The junction of resistors R17 and R18 is connected, through resistor R20, to the positive input of comparator 147. Comparator 147 is, in integrated form, a Texas Instruments type LM339 comparator. The other input to comparator 147 is provided from terminal "MOT-R", through resistor R21.

The "FAST" terminal is buffered through buffer 148 to terminal "CLAMP".

The "CLOCK" terminal which, in this preferred embodiment, carries a square wave clock pulse at 20 KHz from a system clock (not shown) provides an input to NOR gate 142. Flip flop 145 is a toggle type flip flop whose reset input is provided by the output of comparator 147. Its toggle input is provided by the output of NOR gate 142. The Q output of flip flop 145 provides another input to NOR gate 142 ensuring that a clock-pulse will be impressed on the toggle input only when flip flop 145 has been reset (cleared). The Q output of flip flop 145 provides the base drive to transistor T10 whose emitter is grounded and whose collector, as indicated earlier, is tied to the common emitters of transistors T6–T9.

The potentiometer P1 shown in FIG. 2 provides a voltage at the "STP ADJ." terminal. Terminal "VREF" receives a +5 volts input. Terminals "PHA", "PHB", "PHC" and "PHD" are connected through resistors R5, R6, R7 and R8, respectively to the bases of power transistors T1, T2, T3, and T4, respectively. The bases of transistors T1–T4 are also connected through resistors R1, R2, R3 and R4 respectively to a terminal carrying +30 volts to which each of the emitters of T1–T4 are also connected. The collectors of transistors T1–T4 are connected to motor windings WA, WB, WC and WD respectively as well as to the cathodes of diodes D1, D2, D3 and D4 respectively. The other ends of windings WA, WB, WC and WD are tied together and connected to one end of sense resistor R10 whose other end is grounded. Terminal "MOT-R" is connected to the junction of sense resistor R10 and motor coils WA–WD.

The anodes of diodes D1–D4 are connected together to the cathode of diode D5 and to the collector of transistor T5. The anode of diode D5 is connected to the anode of zener diode D6 whose cathode is connected to the base of transistor T5. The emitter of transistor T5 is grounded.

The "CLAMP" terminal of chip 140 is connected, through resistor R11, to +12 volts. It is also connected to the cathode of zener diode D7 whose anode is connected, through resistor R12, to −12 volts. The anode of zener diode D7 is also connected to the cathode of diode D8 whose anode is connected to the base of transistor T5. This network of resistors and diodes determining whether transistor T5 will be turned on, providing essentially a ground reference to the discharge of motor windings WA-WD when the associated power transistor T1-T4 is turned off, or whether transistor T5 will be turned on, providing a −20 volts reference. Capacitor C1 is shown connected between ground and terminal EXTCAP. Capacitor C1 is a filter capacitor for slowing abrupt changes in current to reduce mechanical chattering of the printer.

MODE OF OPERATION

In FIG. 1, it can be seen that a command for the printer mechanism 40 to operate is initiated in microprocessor 25a, the signal being impressed on system data bus 19 and through buffer 29 to I/O data bus 32. I/O data bus 32 provides the appropriate signals through mechanism control latch 37 to the slew motor control 41 of this invention.

In FIG. 3, depending upon the signals impressed on terminals PS1 and PS2, the appropriate transistor T6-T9 is selected. None, of course, can be turned on unless transistor T10 is turned on by reason of the latch circuit comprising NOR gate 142 and flip flop 145 being set. As an example, presume that transistor T10 is turned on and transistor T6 has been selected by decoder 141. Turning transistor T6 on brings terminal "PHA" to nearly a ground potential which is then, as seen in FIG. 2, impressed on the base of transistor T1. This low voltage turns on power transistor T1 which then conducts current through motor winding WA. The current through motor winding WA is conducted through sense resistor R10 to ground. The voltage ramp developed across resistor R10 is indicative of the current through winding WA. The voltage across R10 is placed on terminal "MOT-R" and, as seen in FIG. 3, is impressed through resistor R21 on the negative input of comparator 147. When the voltage ramp impressed through resistor R21 reaches the reference voltage impressed on the positive input of comparator 147, the output of comparator 147 goes low thereby providing a high reset input to the flip flop 145, clearing that flip flop and holding it clear so long as the reset remains high. In the held clear state, the Q output of flip flop 145 goes low and shuts off transistor T10 which in turn prevents conduction by transistor T6 and ultimately shuts off the power transistor T1 thus stopping the conduction through winding WA. Referring to FIG. 2, when transistor T1 cuts off, the motor winding WA has a collapsing field, requiring a discharge path. The current flow had originally been through transistor T1, through motor winding WA, through resistor R10 to ground. With transistor T1 cut off, the current from winding WA flows through resistor R10 to ground through transistor T5 through diode D1 to the other end of winding WA.

When the stepper motor is to be held in a detente position, then the discharge of the motor winding WA may be relatively slow. A ground potential is provided at the "CLAMP" terminal causing zener diode D7 to conduct, and through the R11 and R12 network, presents an approximate −1 V on the base of transistor T5. The discharge of winding WA is then essentially to ground. When the stepper motor is stepped or run at high speed, then the "CLAMP" terminal is open. The left end of winding WA begins going negative and when it reaches approximately −20 V, the zener diode D6 breaks down and begins conducting, placing −1.2 V on the base of transistor T5, causing it to conduct. Under these circumstances, the motor winding discharges to −20 V, providing a much faster discharge.

Returning to FIG. 3, and specifically to the circuitry attached to the reference voltage terminal of the comparator 147, it can be seen that the "STP ADJ." terminal has applied to it a voltage from potentiometer P1. That voltage is set manually to provide the proper result. When the "STEP" terminal has a signal applied, that potential (high or low) is impressed through buffer 146 to the network of resistors R15-R19. The presence of ground or an open at the output of buffer 146, by way of the resistor network mentioned, provides, through resistor R20 a lower or higher signal voltage, respectively. That is, when there is a high present on "STEP", then a higher voltage reference is impressed through resistor R20 to comparator 147. A voltage ramp through resistor R21 therefore must go higher to reach the higher reference voltage. When "STEP" has a ground signal, then the reference voltage is lower and the voltage ramp does not have to rise as high. In either event, the output of comparator 147 goes low when equality is reached.

It should be noted that this type of regulator circuit is effective for this pulse width modulation technique of the latch circuit and comparator when a duty cycle of 50% is not to be exceeded. This requirement is inherent for this type of pulse width modulation to be effective.

It is obvious to one of ordinary skill in the art to substitute components for the particular application, to change values of components and to alter the circuitry for the particular situation, all without departing from the scope of the invention as set out in the appended claims.

What is claimed is:

1. A printing terminal having a printing head movable by a stepper motor, an available DC power source, clocking means and means for selecting the coils of the stepper motor, comprising:
   (a) power switching means connected to the DC power source and to the selected coil;
   (b) control timing means connected to the power switching means for permitting the power switching means to close and open for a fixed cycle period, thereby respectively connecting the selected coil across and disconnecting from the DC power source;
   (c) duty cycle varying means connected to the control timing means for activating the control timing means to vary the time of the power switching means to be opened and closed; and
   (d) current sensing means connected to the selected coil for sensing the current flowing through the selected coil, and connected to the duty cycle varying means to activate the duty cycle varying means when the current reaches a predetermined level, and to deactivate the duty cycle varying means when the current drops below the predetermined level.

2. The terminal of claim 1 wherein the power switching means comprises a power transistor.

3. The terminal of claim 2 wherein the control timing means comprises a latch circuit having an output connected to the control electrode of the power transistor, an input connected to receive signals from the clocking means and a reset input for clearing the latch means, the reset input being connected to the duty cycle varying means.

4. The terminal of claim 3 wherein the duty cycle varying means comprises:
  (i) a reference voltage; and
  (ii) comparator means having one input connected to the reference voltage and having another input connected to the current sensing means to cause the latch circuit to clear when the amplitude of the voltage across the current sensing means reaches the reference voltage amplitude.

5. A printing terminal having a printing head movable by a stepper motor, an available DC power source, clocking means and means for selecting the coils of the stepper motor, comprising:
  (a) a power transistor connected to the DC power source and to the selected coil;
  (b) control timing means, including a flip-flop and a logic gate, the flip-flop having an output connected to the control electrode of the power transistor and also to the input to the logic gate, the clocking means providing the other input of the logic gate, the logic gate having an output providing the clock input to the flip-flop;
  (c) duty cycle varying means connected to the reset input of the flip-flop for activating the control timing means to vary the time of the power transistor to be opened and closed; and
  (d) current sensing means connected to the selected coil for sensing the current flowing through the selected coil, and connected to the duty cycle varying means to activate the duty cycle varying means when the current reaches a predetermined level, and to deactivate the duty cycle varying means when the current drops below the predetermined level.

6. The terminal of claims 3, 4 or 5 wherein the current sensing means comprises a resistor.

7. A drive circuit for driving a stepping motor, adapted to be connected across a DC power source, having a clock circuit and a selection circuit for selecting the coils of the stepper motor, comprising:
  (a) power switching means connected to the DC power source and to the selected coil;
  (b) control timing means connected to the power switching means for permitting the power switching means to close and open for a fixed cycle period, thereby respectively connecting the selected coil across and disconnecting from the DC power source;
  (c) duty cycle varying means connected to the control timing means for activating the control timing means to vary the time of the power switching means to be opened and closed; and
  (d) current sensing means connected to the selected coil for sensing the current flowing through the selected coil, and connected to the duty cycle varying means to activate the duty cycle varying means when the current reaches a predetermined level and to deactivate the duty cycle varying means when the current drops below the predetermined level.

8. The drive circuit of claim 7 wherein the power switching means comprises a power transistor.

9. The drive circuit of claim 8 wherein the control timing means comprises a latch circuit having an output connected to the control electrode of the power transistor, an input connected to receive signals from the clock circuit and a reset input for clearing the latch means, the reset input being connected to the duty cycle varying means.

10. The drive circuit of claim 8 wherein the duty cycle varying means comprises:
  (c)(i) a reference voltage; and
  (ii) comparator means having one input connected to the reference voltage and having another input connected to the current sensing means to cause the latch circuit to clear when the amplitude of the voltage across the current sensing means reaches the reference voltage amplitude.

11. A drive circuit for driving a stepping motor, adapted to be connected across a DC power source, having a clock circuit and a selection circuit for selecting the coils of the stepper motor, comprising:
  (a) a power transistor connected to the DC power source and to the selected coil;
  (b) control timing means, including a flip-flop and a logic gate, the flip-flop having an output connected to the control electrode of the power transistor and also to the input of the logic gate, the clocking means providing the other input to the logic gate, the logic gate having an output providing the clock input to the flip-flop;
  (c) duty cycle varying means connected to the reset input of the flip-flop for activating the control timing means to vary the time of the power transistor to be opened and closed; and
  (d) current sensing means connected to the selected coil for sensing the current flowing through the selected coil, and connected to the duty cycle varying means to activate the duty cycle varying means when the current reaches a predetermined level, and to deactivate the duty cycle varying means when the current drops below the predetermined level.

12. The drive circuit of claims 9, 10, or 11 wherein the current sensing means comprises a resistor.

* * * * *